US012265343B2

(12) United States Patent
Yamamoto et al.

(10) Patent No.: US 12,265,343 B2
(45) Date of Patent: Apr. 1, 2025

(54) IMAGE FORMING APPARATUS ADOPTING AN INTERMEDIATE TRANSFER METHOD

(71) Applicant: KYOCERA Document Solutions Inc., Osaka (JP)

(72) Inventors: Koju Yamamoto, Osaka (JP); Takashi Morita, Osaka (JP); Tatsuro Arata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/414,948

(22) Filed: Jan. 17, 2024

(65) Prior Publication Data

US 2024/0248424 A1 Jul. 25, 2024

(30) Foreign Application Priority Data

Jan. 25, 2023 (JP) ................................ 2023-009236

(51) Int. Cl.
*G03G 15/16* (2006.01)
*G03G 21/16* (2006.01)

(52) U.S. Cl.
CPC ....... *G03G 15/1615* (2013.01); *G03G 21/168* (2013.01)

(58) Field of Classification Search
CPC .. G03G 15/00; G03G 15/161; G03G 15/1615; G03G 21/168
See application file for complete search history.

(56) References Cited

U.S. PATENT DOCUMENTS

2009/0154957 A1* 6/2009 Furuya ................. G03G 15/161 399/121
2017/0300003 A1 10/2017 Tokoro ................. G03G 21/168
2021/0373486 A1* 12/2021 Morita ................. G03G 21/168
2022/0081238 A1* 3/2022 Nakajima .......... G03G 15/1615

FOREIGN PATENT DOCUMENTS

JP 2017-194490 A 10/2017

* cited by examiner

*Primary Examiner* — Sophia S Chen
(74) *Attorney, Agent, or Firm* — Stein IP, LLC

(57) ABSTRACT

An image forming apparatus includes a plurality of image carrying member units and an intermediate transfer unit. The image carrying member units include image carrying members and image carrying member support frames. The intermediate transfer unit includes an intermediate transfer belt. The image forming apparatus includes: a locating member; image carrying member-side guide rails that are formed on upper end portions of the image carrying member support frames and extend along a horizontal direction; and a main body-side guide rail that is formed as a bridge in the horizontal direction between the image carrying member-side guide rails. When the intermediate transfer unit is fitted to the main body of the apparatus, the intermediate transfer unit slides on the image carrying member-side guide rails and the main body-side guide rail and is guided by the locating member to be located in a fitting position.

5 Claims, 5 Drawing Sheets

IMAGE FORMING APPARATUS ADOPTING AN INTERMEDIATE TRANSFER METHOD

INCORPORATION BY REFERENCE

This application is based upon and claims the benefit of priority from the corresponding Japanese Patent Application No. 2023-009236 filed on Jan. 25, 2023, the entire contents of which are incorporated herein by reference.

BACKGROUND

The present disclosure relates to image forming apparatuses.

Conventionally, an image forming apparatus is provided which adopts an intermediate transfer method as a method for transferring toner images to a sheet. The image forming apparatus as described above includes a plurality of image carrying member units and an intermediate transfer unit.

The intermediate transfer unit includes an endless intermediate transfer belt which is turned in a predetermined direction. The image carrying member units are arranged along the direction of rotation of the intermediate transfer belt. In the image forming apparatus of the intermediate transfer method as described above, toner images are sequentially superimposed by the image carrying member units on the intermediate transfer belt and are thereafter transferred onto a sheet at a time.

Here, the service life of the intermediate transfer belt is shorter than the life of the main body of the image forming apparatus. Hence, the intermediate transfer belt as described above needs to be replaced periodically. Therefore, a configuration in which the intermediate transfer unit including the intermediate transfer belt is removable with respect to the main body of the image forming apparatus is widely used.

In general, when the intermediate transfer unit as described above is fitted to the main body of the image forming apparatus, the intermediate transfer unit is inserted into the main body of the apparatus from an opening portion formed in an upper portion of the main body of the apparatus and is arranged in a predetermined position (fitting position). When the intermediate transfer unit is fitted to the main body of the apparatus, the intermediate transfer unit is arranged above the image carrying member units such that the intermediate transfer unit is placed laterally (horizontally) with respect to the main body of the apparatus.

SUMMARY

An image forming apparatus according to an aspect of the present disclosure includes image carrying member units and an intermediate transfer unit. The image carrying member unit includes an image carrying member that carries a toner image on an outer circumferential surface and an image carrying member support frame that rotatably supports the image carrying member. A plurality of image carrying member units are aligned in a horizontal direction. The intermediate transfer unit includes an endless intermediate transfer belt which is rotatably supported and a plurality of primary transfer members which are opposite the image carrying members through the intermediate transfer belt, and is removable with respect to the main body of the apparatus in the horizontal direction. The image forming apparatus primarily transfers, in a state where the intermediate transfer unit is fitted to the main body of the apparatus, the toner images carried on the outer circumferential surfaces of the image carrying members by the primary transfer member to the intermediate transfer belt. The image forming apparatus includes: a locating member that is arranged on the downstream side of the image carrying member units in a direction in which the intermediate transfer unit is fitted so as to locate the intermediate transfer unit in a fitting position in which the intermediate transfer unit is fitted to the main body of the apparatus; image carrying member-side guide rails that are formed on upper end portions of the image carrying member support frames included in a first image carrying member unit closest to the locating member in the horizontal direction and a second image carrying member unit adjacent to the first image carrying member unit of the image carrying member units and extend along the horizontal direction; and a main body-side guide rail that is formed as a bridge in the horizontal direction between the image carrying member-side guide rails included in the first image carrying member unit and the second image carrying member unit. When the intermediate transfer unit is fitted to the main body of the apparatus, the intermediate transfer unit slides on the image carrying member-side guide rails and the main body-side guide rail and is guided by the locating member to be located in the fitting position.

DETAILED DESCRIPTION

Figure 1:
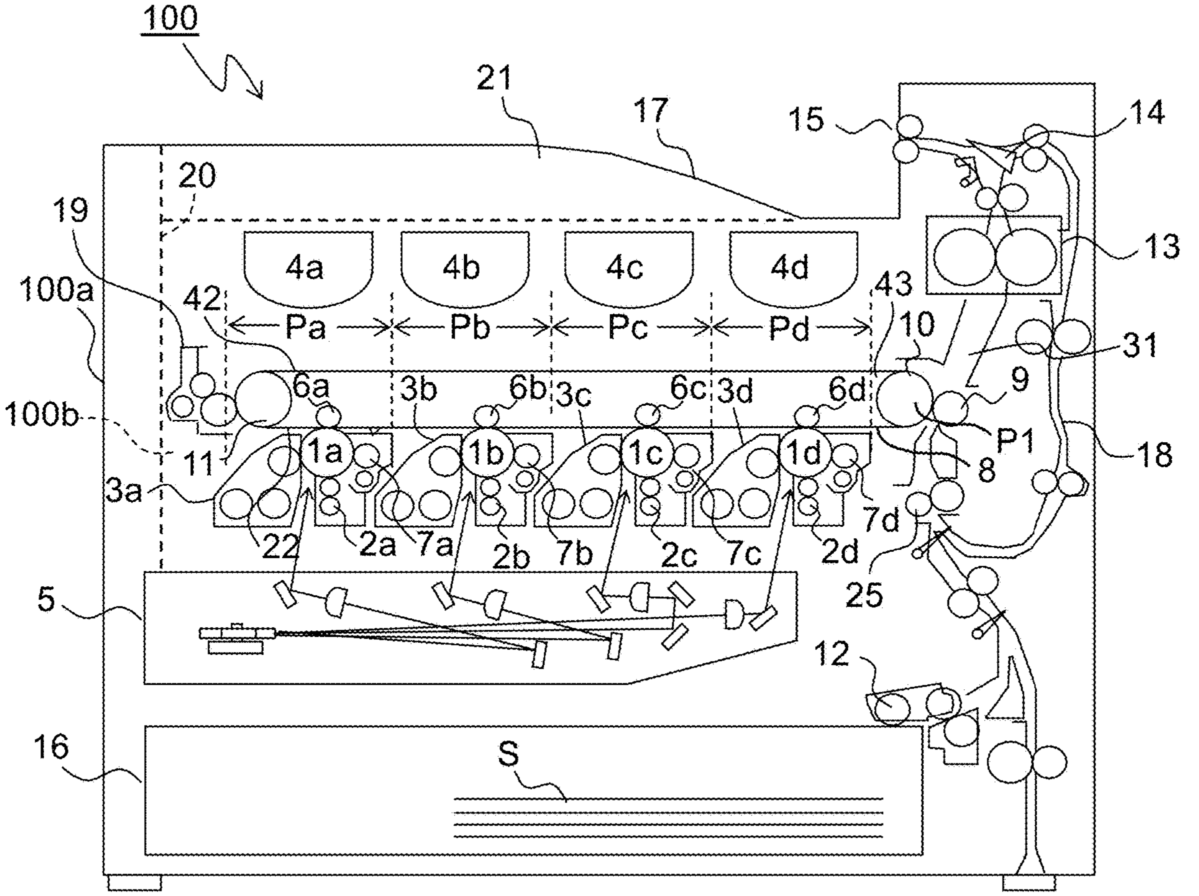
FIG. 1 is a schematic cross-sectional view showing an internal structure of an image forming apparatus according to a first embodiment of the present disclosure.

A first embodiment of the present disclosure will be described below with reference to drawings. FIG. 1 is a schematic cross-sectional view showing an internal structure of an image forming apparatus 100 according to the first embodiment of the present disclosure. The overall configuration of the image forming apparatus 100 will first be described with reference to FIG. 1.

As shown in FIG. 1, in the main body (hereinafter referred to as the "apparatus main body **100*a*") of the image forming apparatus 100 (here, a color printer), a storage space 100*b* is formed. In the storage space 100*b*, various constituent elements of the image forming apparatus 100** are stored.

In the storage space **100*b*, four image formation units Pa to Pd are formed sequentially from the upstream side of a conveyance direction (left side in FIG. 1**). The image formation units Pa to Pd are provided according to images of four different colors (cyan, magenta, yellow and black), and sequentially form images of cyan, magenta, yellow and black in steps of charging, exposure, development and transfer.

The image formation units Pa to Pd include drum units 40*a* to 40*d* (image carrying member units, see FIG. 2), an intermediate transfer unit 42, charging devices 2*a* to 2*d*, an exposure device 5, development devices 3*a* to 3*d* and cleaning devices 7*a* to 7*d*.

The drum units 40*a* to 40*d* are aligned in a horizontal direction. The drum units 40*a* to 40*d* include photosensitive drums 1*a* to 1*d* (image carrying members) and drum support frames 41*a* to 41*d* (see FIG. 2). The photosensitive drums 1*a* to 1*d* carry visible images (toner images) of the colors. The drum support frames 41*a* to 41*d* rotatably support the photosensitive drums 1*a* to 1*d*. The details of the drum support frames 41*a* to 41*d* will be described later.

The photosensitive drums 1*a* to 1*d* are connected to a main motor (unillustrated). The photosensitive drums 1*a* to 1*d* are rotated by the rotational driving force of the main motor in a clockwise direction shown in FIG. 1.

The charging devices 2*a* to 2*d* charge the photosensitive drums 1*a* to 1*d*. The exposure device 5 exposes image information to the photosensitive drums 1*a* to 1*d*. Predetermined amounts of two-component developers including the toners of the colors of cyan, magenta, yellow and black are respectively filled in the development devices 3*a* to 3*d*.

The development devices 3*a* to 3*d* form the toner images on the photosensitive drums 1*a* to 1*d*. The polarities of the toner images here are positive. When the ratios of the toners in the two-component developers filled in the development devices 3*a* to 3*d* drop below specified values, the development devices 3*a* to 3*d* are replenished from toner containers 4*a* to 4*d* with the toners. The cleaning devices 7*a* to 7*d* remove the developers (toners) left on the photosensitive drums 1*a* to 1*d*.

The intermediate transfer unit 42 is removably fitted to the apparatus main body 100*a* in a position (fitting position P1 which will be described later) above the drum units 40*a* to 40*d*. Here, the configuration of the intermediate transfer unit 42 will be described in an example of a state where the intermediate transfer unit 42 is fitted to the apparatus main body 100*a*. The removable form of the intermediate transfer unit 42 will be described later.

The intermediate transfer unit 42 includes an intermediate transfer belt 8, a belt support frame 43, a drive roller 10, a driven roller 11, primary transfer rollers 6*a* to 6*d* and a belt cleaning unit 19.

As the intermediate transfer belt 8, a sheet made of dielectric resin (resin material containing conductive carbon) is used, and a belt without seams (seamless belt) is used. The intermediate transfer belt 8 abuts on the photosensitive drums 1*a* to 1*d*. When the intermediate transfer belt 8 is fitted to the apparatus main body 100*a*, the surface of the intermediate transfer belt 8 which abuts on the drum units 40*a* to 40*d* is referred to as a lower surface 22.

The belt support frame 43 is arranged inside the intermediate transfer belt 8. The belt support frame 43 is formed to be elongated in one direction. The longitudinal direction of the belt support frame 43 corresponds to the horizontal direction. In the following description, the longitudinal direction of the belt support frame 43 is simply referred to as the "longitudinal direction".

The drive roller 10, the driven roller 11 and the primary transfer rollers 6*a* to 6*d* are rotatably supported by the belt support frame 43.

The drive roller 10 is located at one end (the side of the image formation unit 4*d*, the right side of FIG. 1) of the belt support frame 43 in the longitudinal direction. The drive roller 10 is connected to a belt drive motor (unillustrated) which outputs a rotational driving force.

The driven roller 11 is located at the other end (the side of the image formation unit 4*a*, the left side of FIG. 1) of the belt support frame 43 in the longitudinal direction.

The intermediate transfer belt 8 is stretched over the drive roller 10 and the driven roller 11. The drive roller 10 is rotated by the rotational driving force of the belt drive motor, and thus the intermediate transfer belt 8 is rotated in the circumferential direction of the drive roller 10. The driven roller 11 is driven to rotate by the intermediate transfer belt 8.

The primary transfer rollers 6*a* to 6*d* are opposite the photosensitive drums 1*a* to 1*d* through the intermediate transfer belt 8. The primary transfer rollers 6*a* to 6*d* apply an electric field at a predetermined transfer voltage to the intermediate transfer belt 8 between the primary transfer rollers 6*a* to 6*d* and the photosensitive drums 1*a* to 1*d*.

The belt cleaning unit 19 is provided at the other end (the left side of FIG. 1) of the belt support frame 43 in the longitudinal direction. A lower end portion of the belt cleaning unit 19 is located lower than the lower surface 22 of the intermediate transfer belt 8.

The belt cleaning unit 19 is opposite the driven roller 11 through the intermediate transfer belt 8. The belt cleaning unit 19 removes the toners left on the surface of the intermediate transfer belt 8.

In a lower portion of the apparatus main body 100*a*, a sheet cassette 16 which stores sheets S (recording media such as print sheets and OHP sheets) is provided. In a side portion of the apparatus main body 100*a* (on the side of the storage space 100*b*), a paper feed roller 12, a main conveyance path 31, an ejection roller pair 15, a secondary transfer roller 9, a fixing device 13 and a registration roller pair 25 are provided.

The paper feed roller 12 is provided above the sheet cassette 16, and abuts on the uppermost sheet S in the sheet cassette 16. The main conveyance path 31 is a path which extends from the paper feed roller 12 to the ejection roller pair 15 provided in an upper portion of the image forming apparatus 100 and along which the sheet S is conveyed. The paper feed roller 12 feeds the sheets S in the sheet cassette 16 to the main conveyance path 31 one by one.

The main conveyance path 31 is branched partway to a double-sided conveyance path 18. The double-sided conveyance path 18 extends downward from a branch part of the main conveyance path 31 and the double-sided conveyance path 18, and rejoins the main conveyance path 31. At the branch part, a branch portion 14 is provided.

The branch portion 14 distributes the sheet S in the main conveyance path 31 to the ejection roller pair 15 or the double-sided conveyance path 18. The ejection roller pair 15 ejects the distributed sheet S onto an ejection tray 17 formed on the upper surface of the image forming apparatus 100.

The secondary transfer roller 9 is located on an upstream side with respect to the branch portion 14 of the main conveyance path 31 in a sheet conveyance direction and on a downstream side with respect to a part where the double-sided conveyance path 18 and the main conveyance path 31 are rejoined. The secondary transfer roller 9 is opposite the drive roller 10 through the intermediate transfer belt 8. The secondary transfer roller 9 forms a secondary transfer nip between the intermediate transfer belt 8 and itself.

The registration roller pair 25 is located on the downstream side with respect to the part of the main conveyance path 31 where the main conveyance path 31 and the double-sided conveyance path 18 are rejoined. The registration roller pair 25 corrects the skew of the sheet S fed to the main conveyance path 31 and conveys the sheet S to the secondary transfer nip with predetermined timing.

Figure 2:
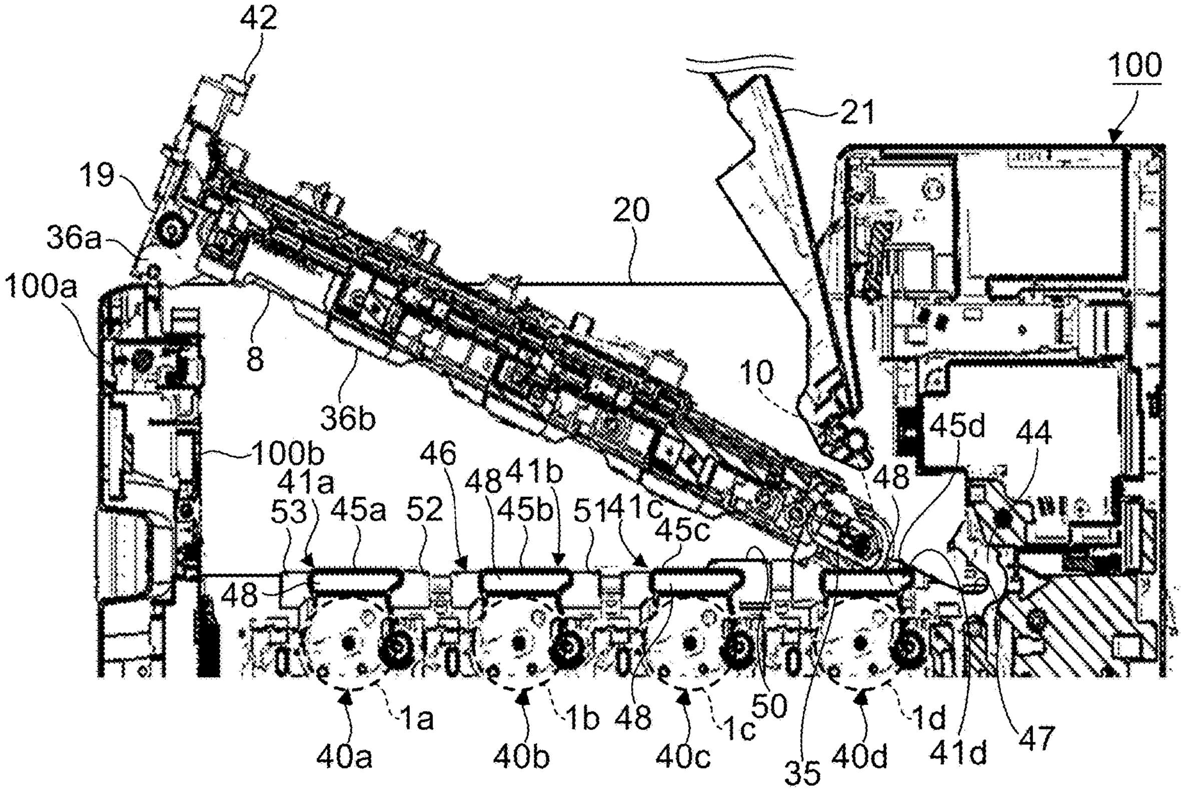
FIG. 2 is a cross-sectional view of the image forming apparatus showing a state where an intermediate transfer unit is being guided to a fitting position by drum-side guide rails and a main body-side guide rail.

The removable configuration of the intermediate transfer unit 42 will then be described in detail. FIG. 2 is a cross-sectional view of the image forming apparatus 100 showing a state where the intermediate transfer unit 42 is being guided to the fitting position P1 by drum-side guide rails 45*a* to 45*d* and a main body-side guide rail 46.

As shown in FIGS. 1 and 2, in the apparatus main body 100*a*, an opening portion 20 is formed. The opening portion 20 is formed in the upper surface of the apparatus main body 100*a*. The storage space 100*b* extends downward from the opening portion 20.

The apparatus main body 100*a* includes an upper surface cover 21. The upper surface cover 21 is swingably supported by the apparatus main body 100*a*. The upper surface cover 21 swings to open and close the opening portion 20. The ejection tray 17 is formed on the surface of the upper surface cover 21. In a state where the upper surface cover 21 swings to open the opening portion 20, the intermediate transfer unit 42 and the drum units 40*a* to 40*d* can be inserted into and removed from the storage space 100*b* through the opening portion 20.

Figure 3:
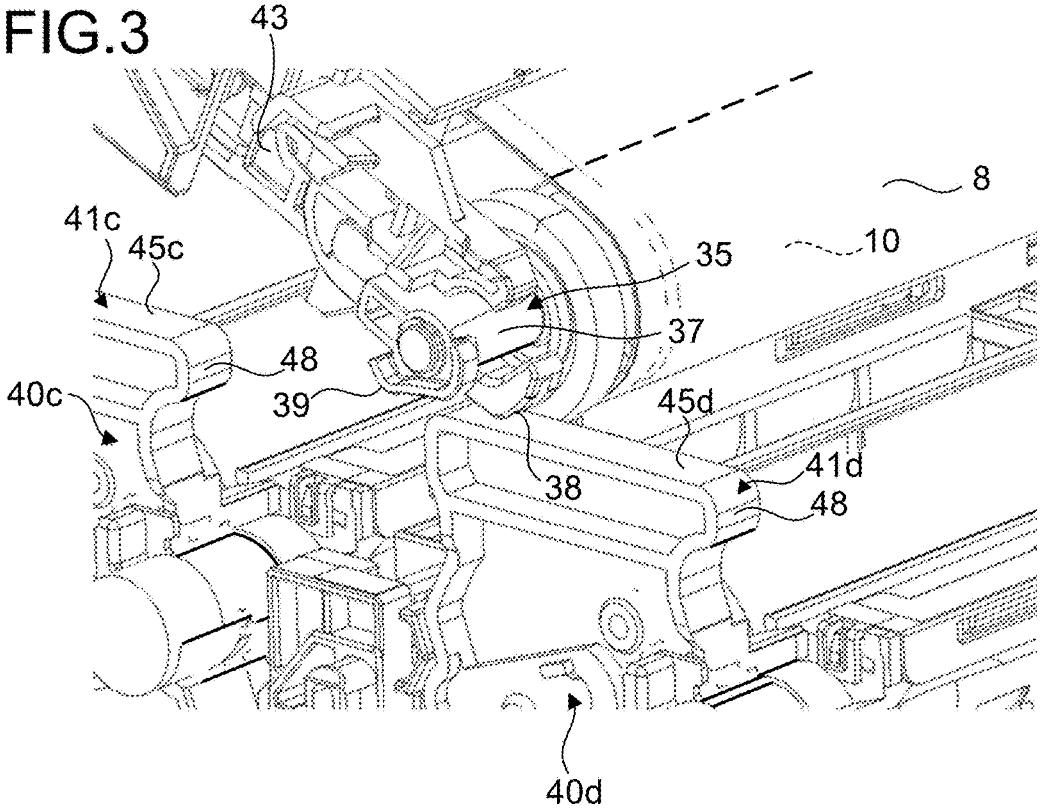
FIG. 3 is an enlarged perspective view of the vicinity of an engagement protrusion portion of the intermediate transfer unit in the state shown in FIG. 2.

FIG. 3 is an enlarged perspective view of the vicinity of an engagement protrusion portion 35 of the intermediate transfer unit 42 in the state shown in FIG. 2. As shown in FIGS. 2 and 3, the belt support frame 43 includes the engagement protrusion portion 35 and abutment ribs 36*a* and 36*b*.

The engagement protrusion portion 35 protrudes to the outside of both end portions of the intermediate transfer belt 8 in a direction parallel to the rotation axes of the photosensitive drums 1*a* to 1*d* (hereinafter simply referred to as the "direction of the rotation axis"). The engagement protrusion portion 35 is located to overlap the drive roller 10 in the longitudinal direction of the belt support frame 43. The engagement protrusion portion 35 is located adjacent to the center of rotation of the drive roller 10 in the radial direction of the drive roller 10.

The engagement protrusion portion 35 includes a locating protrusion portion 37, a first sliding portion 38 and a second sliding portion 39. The locating protrusion portion 37 is arranged on the rotation axis of the drive roller 10. The locating protrusion portion 37 includes a bearing structure which supports the rotation axis of the drive roller 10 such that the drive roller 10 can be rotated.

The first sliding portion 38 and the second sliding portion 39 are arranged on the outside of the locating protrusion portion 37 in the radial direction of the drive roller 10. The first sliding portion 38 and the second sliding portion 39 are arranged side by side in the direction of the rotation axis. The first sliding portion 38 is located inward of the second sliding portion 39 in the direction of the rotation axis.

The abutment ribs 36*a* and 36*b* protrude downward from the belt support frame 43 to the outside of the surface of the intermediate transfer belt 8. In the state where the intermediate transfer unit 42 is fitted to the apparatus main body 100*a*, the abutment ribs 36*a* and 36*b* protrude below the lower surface 22 (see FIG. 1) of the intermediate transfer belt 8.

In the state where the intermediate transfer unit 42 is fitted to the apparatus main body 100*a*, the abutment ribs 36*a* and 36*b* are located to avoid overlapping the photosensitive drums 1*a* to 1*d* in the longitudinal direction of the belt support frame 43.

The abutment rib 36*a* is located outside the driven roller 11 (see FIG. 1) in the longitudinal direction. In the state where the intermediate transfer unit 42 is fitted to the apparatus main body 100*a*, the abutment rib 36*a* is located closer to the outside of the apparatus main body 100*a* than the photosensitive drum 1*a* in the longitudinal direction of the belt support frame 43.

The abutment rib 36*b* is located inward of the abutment rib 36*a* and on the side of the abutment rib 36*a* with respect to the center of the belt support frame 43 in the longitudinal direction of the belt support frame 43. In the state where the intermediate transfer unit 42 is fitted to the apparatus main body 100*a*, the abutment rib 36*b* is located between the photosensitive drum 1*a* and the photosensitive drum 1*b* in the longitudinal direction of the belt support frame 43.

The drum support frames 41*a* to 41*d* include handle portions 48. The handle portions 48 are located in upper end portions of the drum support frames 41*a* to 41*d*. The handle portions 48 protrude upward with respect to the photosensitive drums 1*a* to 1*d*. An operator can fit or remove the drum units 40*a* to 40*d* to or from the apparatus main body 100*a* by pinching the handle portions 48 with fingers.

In the drum support frames 41*a* to 41*d*, the drum-side guide rails 45*a* to 45*d* (image carrying member-side guide rails) are formed. The drum-side guide rails 45*a* to 45*d* are located on the upper end portions of the handle portions 48.

The drum-side guide rails 45*a* to 45*d* are flat surfaces which are formed on the upper end surfaces of the handle portions 48 along the horizontal direction. The drum-side guide rails 45*a* to 45*d* are linearly aligned in the horizontal direction. The drum-side guide rails 45*a* to 45*d* are located substantially on the same plane.

The image forming apparatus 100 includes, in addition to the configuration described above, a locating member 44 and the main body-side guide rail 46.

Figure 4:
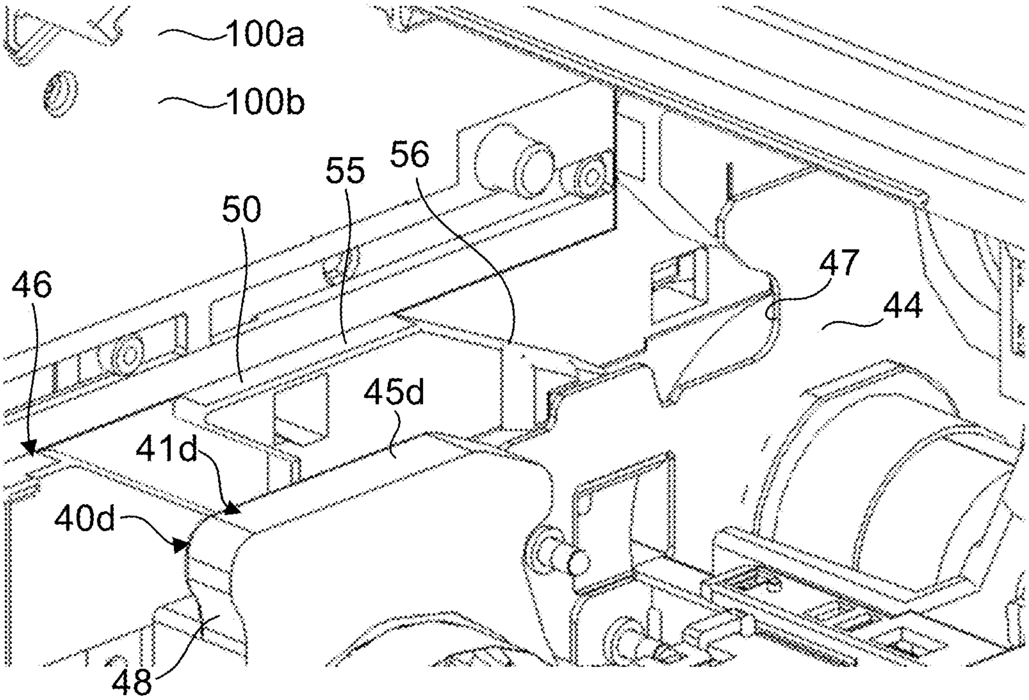
FIG. 4 is an enlarged perspective view of the vicinity of a locating member, the drum-side guide rails and the main body-side guide rail.
Figure 5:
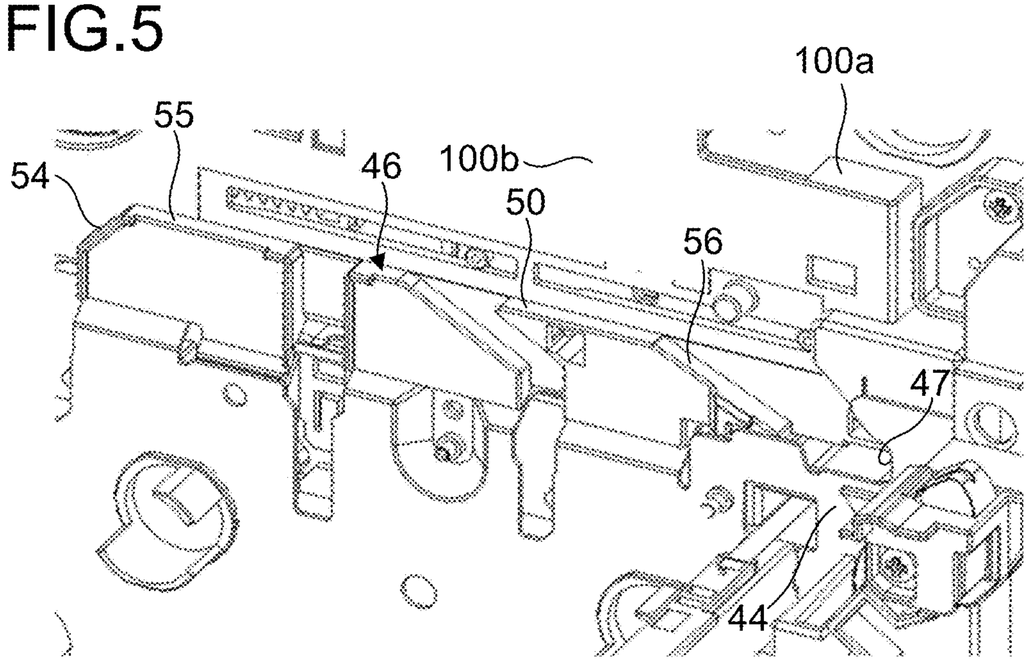
FIG. 5 is an enlarged perspective view of the vicinity of the main body-side guide rail.

FIG. 4 is an enlarged perspective view of the vicinity of the locating member 44, the drum-side guide rail 45*d* and the main body-side guide rail 46. FIG. 5 is an enlarged perspective view of the vicinity of the main body-side guide rail 46. In FIG. 5, the drum units 40*c* and 40*d* are omitted.

As shown in FIGS. 2, 4 and 5, the locating member 44 is located on a side opposite to the drum unit 40*c* through the drum unit 40*d* in the horizontal direction.

The locating member 44 locates the intermediate transfer unit 42 in the fitting position P1. The fitting position P1 is a position (see FIG. 1) in which the intermediate transfer unit 42 is fitted to the apparatus main body 100*a*. The locating member 44 is a sheet metal member. The locating member 44 is arranged on each of both outer sides of the drum units 40*a* to 40*d* in the direction of the rotation axis. The locating member 44 is fixed to the apparatus main body 100*a*.

In the locating member 44, a locating recess portion 47 is formed. The locating recess portion 47 is formed in a recess shape which is recessed in the radial direction of the drive roller 10. In a state where the intermediate transfer unit 42 is guided to the fitting position P1, the outer circumferential surface of the locating protrusion portion 37 abuts on the inner circumferential surface of the locating recess portion 47. In this way, the intermediate transfer unit 42 is located in the fitting position P1 by the locating member 44.

The main body-side guide rail 46 includes a flat surface which extends linearly in the horizontal direction. The main body-side guide rail 46 is arranged on the outside of the drum-side guide rails 45*a* to 45*d* in the direction of the rotation axis.

The intermediate transfer unit 42 is guided to the fitting position P1 by the drum-side guide rails 45*a* to 45*d* and the main body-side guide rail 46 such that the engagement protrusion portion 35 slides on the drum-side guide rails 45*a* to 45*d* and the main body-side guide rail 46. The direction (left to right direction in FIG. 2) of the guidance is simply referred to as a "fitting direction". A direction (the right side of FIG. 2) in which the intermediate transfer unit 42 moves close to the fitting position P1 is referred to as a downstream side in the fitting direction, and a direction (the left side of FIG. 2) in which the intermediate transfer unit 42 moves away from the fitting position P1 is referred to as an upstream side in the fitting direction.

The main body-side guide rail 46 includes a first rail portion 50, a second rail portion 51, a third rail portion 52 and a fourth rail portion 53 which are aligned in the horizontal direction.

The first rail portion 50 is arranged between the drum unit 40*c* and the drum unit 40*d* in the horizontal direction. The second rail portion 51 is arranged between the drum unit 40*b* and the drum unit 40*c* in the horizontal direction. The third rail portion 52 is arranged between the drum unit 40*a* and the drum unit 40*b* in the horizontal direction. The fourth rail portion 53 is arranged on a side opposite to the drum unit 40*b* through the drum unit 40*a* in the horizontal direction.

In the fitting direction, an end portion of the first rail portion 50 on the upstream side is located to overlap the drum-side guide rail 45*c*. In the fitting direction, an end portion of the first rail portion 50 on the downstream side is located to overlap the drum-side guide rail 45*d*.

More specifically, the first rail portion 50 includes a first inclination portion 54, a straight portion 55 and a second inclination portion 56. The first inclination portion 54 is a part which is located at an end portion of the first rail portion 50 on the upstream side in the fitting direction. The first inclination portion 54 is inclined upward as the first inclination portion 54 extends to the downstream side in the fitting direction.

The straight portion 55 is a part which is located in the middle of the first rail portion 50 in the fitting direction. The straight portion 55 linearly extends parallel to the horizontal direction. In the fitting direction, an end portion of the straight portion 55 on the upstream side is connected to an end portion of the first inclination portion 54 on the downstream side.

The second inclination portion 56 is a part which is located at an end portion of the first rail portion 50 on the downstream side in the fitting direction. The second inclination portion 56 is inclined downward as the second inclination portion 56 extends to the downstream side in the fitting direction. An end portion of the second inclination portion 56 on the upstream side is connected to an end portion of the straight portion 55 on the downstream side.

Figure 6:
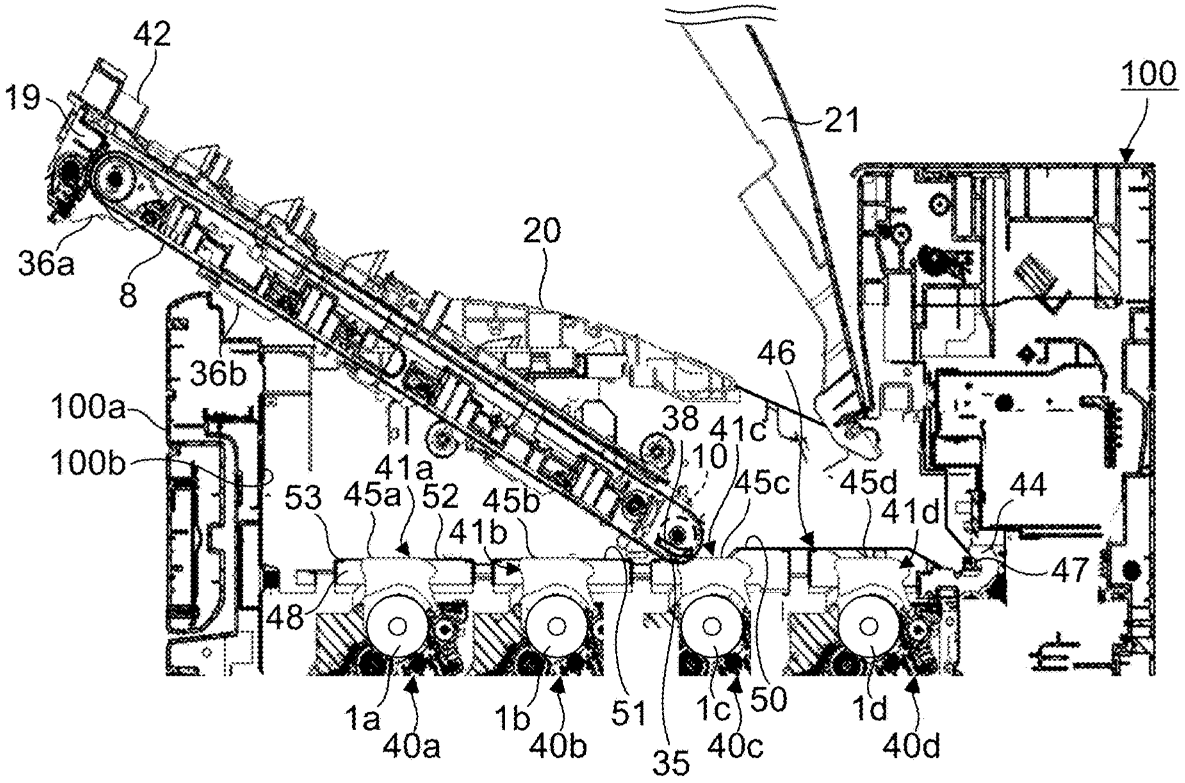
FIG. 6 is a cross-sectional view of the image forming apparatus showing how the intermediate transfer unit is guided to the fitting position.
Figure 7:
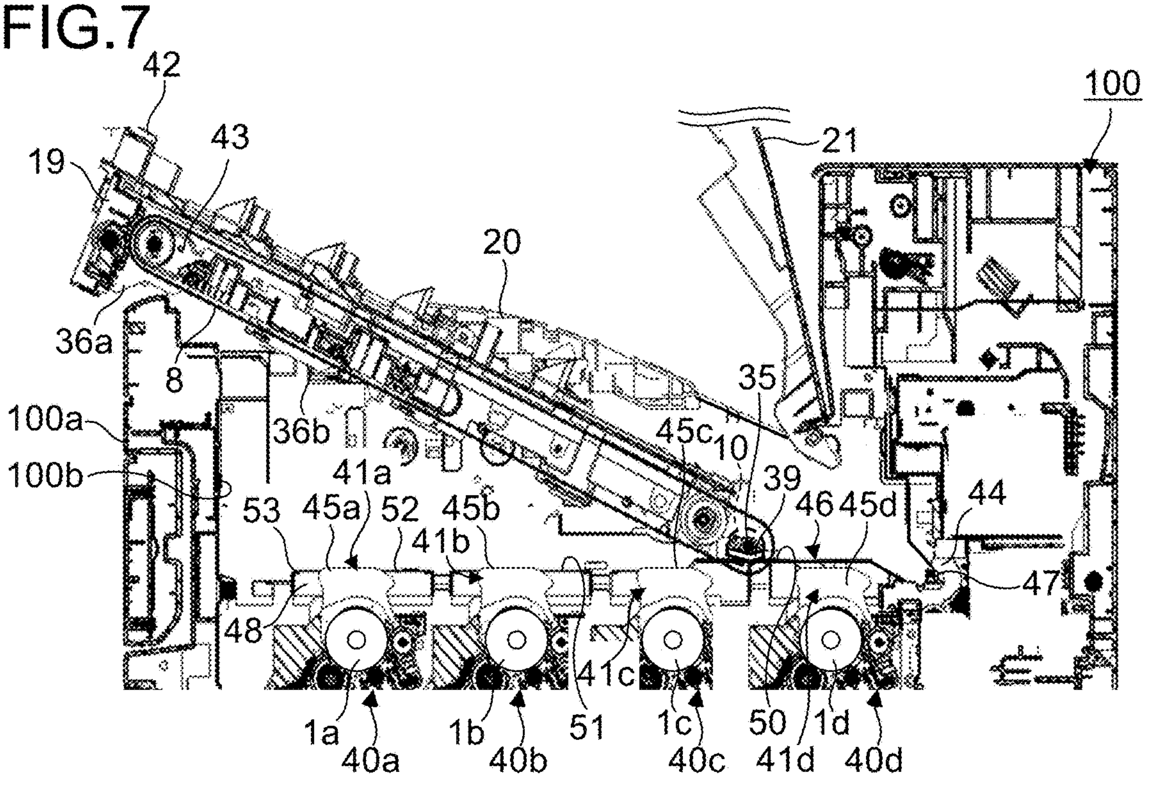
FIG. 7 is a cross-sectional view of the image forming apparatus showing how the intermediate transfer unit is guided to the fitting position.
Figure 8:
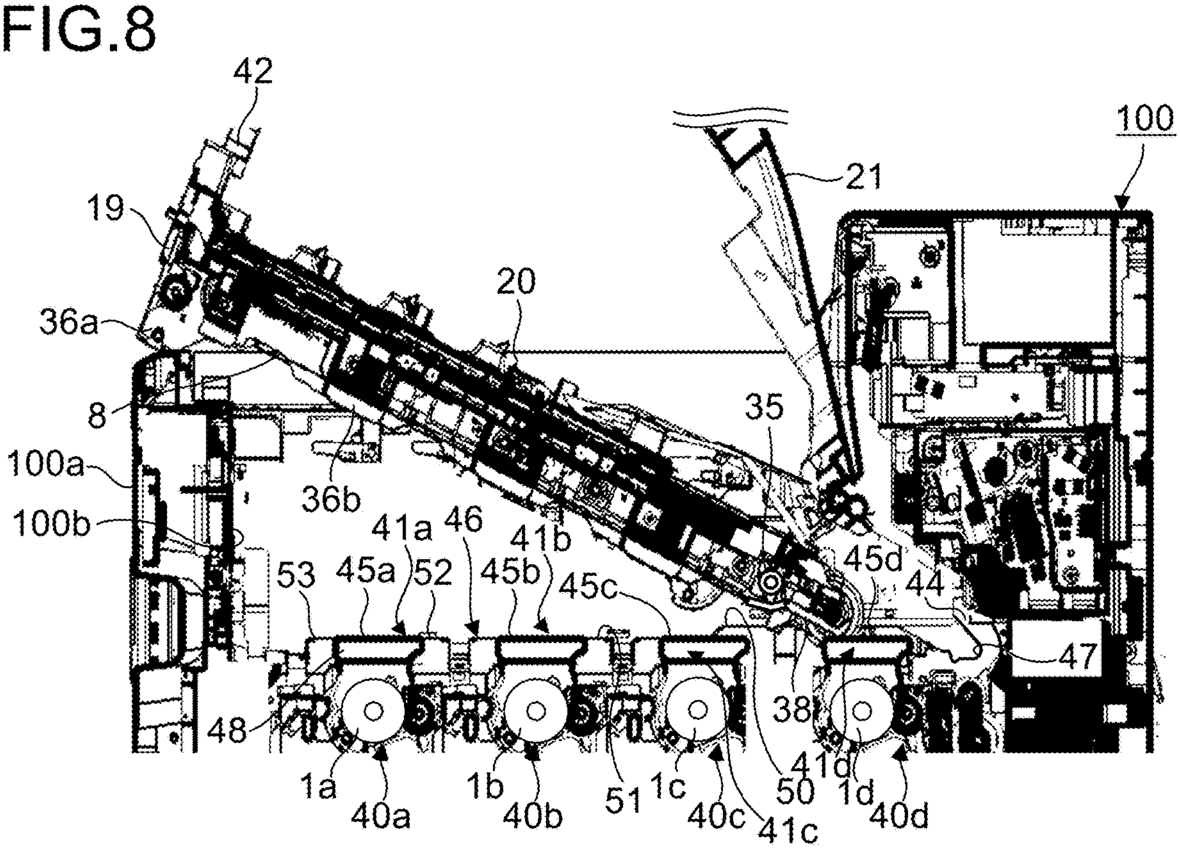
FIG. 8 is a cross-sectional view of the image forming apparatus showing how the intermediate transfer unit is guided to the fitting position.

A form when the intermediate transfer unit 42 is fitted to the apparatus main body 100*a* in the fitting position P1 will then be described in detail with reference to FIGS. 6 to 8. FIGS. 6 to 8 are cross-sectional views of the image forming apparatus 100 showing how the intermediate transfer unit 42 is guided to the fitting position P1. As sequentially shown in FIGS. 6 to 8, the intermediate transfer unit 42 is guided to the fitting position P1. A specific method is as follows.

The upper surface cover 21 is first swung to open the opening portion 20. Then, the intermediate transfer unit 42 is inserted from the opening portion 20 into the storage space 100*b* of the apparatus main body 100*a*. Here, the intermediate transfer unit 42 is inserted with the side of the drive roller 10 directed downward.

Then, as shown in FIG. 6, the engagement protrusion portion 35 is caused to abut on the drum-side guide rail 45*c* or the main body-side guide rail 46. Here, the first sliding portion 38 may be located to abut on the drum-side guide rail 45*c* or the second sliding portion 39 may be located to abut on the first rail portion 50. Here, a case where the first sliding portion 38 is caused to abut on the drum-side guide rail 45*c* will be described.

In a state where the first sliding portion 38 abuts on the drum-side guide rail 45*c*, the abutment rib 36*b* abuts on the edge part of the opening portion 20 of the apparatus main body 100*a*. As described above, the abutment rib 36*b* protrudes outward (downward) with respect to the intermediate transfer belt 8, and thus it is possible to avoid contact between the intermediate transfer belt 8 and the apparatus main body 100*a*.

In this state, the intermediate transfer unit 42 is moved in the fitting direction. Then, while the first sliding portion 38 is sliding on the drum-side guide rail 45*c*, the intermediate transfer unit 42 is guided to the fitting position P1.

When the engagement protrusion portion 35 reaches the first rail portion 50, the second sliding portion 39 abuts on the first inclination portion 54. When in this state, the intermediate transfer unit 42 is further moved in the fitting direction, while the second sliding portion 39 is sliding on the first inclination portion 54, the engagement protrusion portion 35 rides on the main body-side guide rail 46 from the drum-side guide rail 45*c*. Here, the first sliding portion 38 is separated from the drum-side guide rail 45*c*. Then, as shown in FIG. 7, the second sliding portion 39 slides on the straight portion 55.

When the intermediate transfer unit 42 is further moved in the fitting direction, the second sliding portion 39 abuts on the second inclination portion 56. Then, the second sliding portion 39 is moved downward along the second inclination portion 56, and thus as shown in FIG. 8, the first sliding portion 38 abuts on the drum-side guide rail 45*d* again.

Here, the abutment rib 36*a* abuts on the edge part of the opening portion 20 of the apparatus main body 100*a*. As described above, the abutment rib 36*a* protrudes outward (downward) with respect to the intermediate transfer belt 8, and thus it is possible to avoid contact between the intermediate transfer belt 8 and the apparatus main body 100*a*.

When the intermediate transfer unit 42 is further moved in the fitting direction, while the first sliding portion 38 is sliding on the drum-side guide rail 45, the engagement protrusion portion 35 reaches the locating member 44. When in this state, the intermediate transfer unit 42 is further moved in the fitting direction, the engagement protrusion portion 35 enters the locating recess portion 47. Then, the outer circumferential surface of the locating protrusion portion 37 abuts on the inner circumferential surface of the locating recess portion 47.

In this state, the locating recess portion 47 is used as a bearing, and thus the intermediate transfer unit 42 is rotated with the locating protrusion portion 37 used as the center of the rotation such that the side of the drive roller 10 is moved downward. In this way, the entire intermediate transfer unit 42 is stored in the storage space 100*b*, and the intermediate transfer unit 42 is brought into a horizontal state, with the result that the intermediate transfer unit 42 reaches the fitting position P1. In this state, the intermediate transfer unit 42 is located by the locating member 44.

While the intermediate transfer unit 42 of the image forming apparatus 100 according to the embodiment described above is sliding on the drum-side guide rails 45*a* to 45*d* and the main body-side guide rail 46, the intermediate transfer unit 42 is guided by the locating member 44. Then, the intermediate transfer unit 42 is located in the fitting position P1 by the locating member 44. Hence, the intermediate transfer unit 42 can easily be arranged in the fitting position P1, and thus it is possible to suppress deterioration in ease of assembly and replaceability. Therefore, it is possible to provide the image forming apparatus 100 in which the intermediate transfer unit 42 is easily replaceable.

When the intermediate transfer unit 42 is guided to the locating member 44, even if the intermediate transfer unit 42 is excessively inclined to the horizontal, the abutment ribs 36*a* and 36*b* abut on the apparatus main body 100*a* before the intermediate transfer belt 8 abuts thereon, with the result that contact between the intermediate transfer belt 8 and the apparatus main body 100*a* is avoided. In this way, it is possible to suppress the occurrence of a problem in which when the intermediate transfer unit 42 is fitted, the intermediate transfer belt 8 is brought into contact with the apparatus main body 100*a*, and thus the surface of the intermediate transfer belt 8 is damaged.

The drum-side guide rails 45*a* to 45*d* are formed on the handle portions 48 of the drum support frames 41*a* to 41*d*. Hence, without the provision of an extra guide structure, the engagement protrusion portion 35 is caused to slide on the drum-side guide rails 45*a* to 45*d*, and thus the intermediate transfer unit 42 can be guided.

The first rail portion 50 of the main body-side guide rail 46 is provided between the drum-side guide rail 45*c* and the drum-side guide rail 45*d*, and thus the intermediate transfer unit 42 can be smoothly guided along the first rail portion 50 between the drum-side guide rail 45*c* and the drum-side guide rail 45*d*.

As described above, when the intermediate transfer unit 42 is moved in the fitting direction, the engagement protrusion portion 35 slides on the drum-side guide rail 45*c*, the first rail portion 50 and the drum-side guide rail 45*d* in this order. Hence, it is not necessary to transfer the intermediate transfer unit 42 to a different rail and to lift the intermediate transfer unit 42 when the intermediate transfer unit 42 is fitted. Therefore, it is possible to suppress deterioration in the replaceability and the ease of assembly of the intermediate transfer unit 42.

The present disclosure is not limited to the embodiment described above, and various changes can be made without departing from the spirit of the present disclosure. For example, although the engagement protrusion portion 35 is caused to abut on the drum-side guide rail 45*c* or the main body-side guide rail 46 when the intermediate transfer unit 42 in the embodiment is fitted to the apparatus main body 100*a*, the engagement protrusion portion 35 may be arranged to abut on the drum-side guide rail 45*a*, 45*b* or 45*d* Likewise, the engagement protrusion portion 35 may be caused to abut on the second rail portion 51, the third rail portion 52 or the fourth rail portion 53.

For example, when the engagement protrusion portion 35 is caused to abut on the fourth rail portion 53, the second sliding portion 39 first abuts on the fourth rail portion 53. When in this state, the intermediate transfer unit 42 is moved in the fitting direction, then the first sliding portion 38 abuts on the drum-side guide rail 45*a*. Here, the engagement protrusion portion 35 slides on the drum-side guide rail 45*a*.

When in this state, the intermediate transfer unit 42 is further moved in the fitting direction, the second sliding portion 39 abuts on the second rail portion 51, and thus the first sliding portion 38 is separated from the drum-side guide rail 45*a*. Here, the engagement protrusion portion 35 slides on the second rail portion 51.

When in this state, the intermediate transfer unit 42 is further moved in the fitting direction, the second sliding portion 39 is separated from the second rail portion 51, and thus the first sliding portion 38 abuts on the drum-side guide rail 45*b*. Here, the engagement protrusion portion 35 slides on the drum-side guide rail 45*b*.

When in this state, the intermediate transfer unit 42 is further moved in the fitting direction, the second sliding portion 39 abuts on the third rail portion 52, and thus the first sliding portion 38 is separated from the drum-side guide rail 45*b*. Here, the engagement protrusion portion 35 slides on the third rail portion 52.

When in this state, the intermediate transfer unit 42 is further moved in the fitting direction, the second sliding portion 39 is separated from the third rail portion 52, and thus the first sliding portion 38 abuts on the drum-side guide rail 45*c*. Here, as described above, the engagement protrusion portion 35 slides on the drum-side guide rail 45*c*.

The present disclosure can be adopted for image forming apparatuses of the intermediate transfer method. By the utilization of the present disclosure, it is possible to provide an image forming apparatus in which an intermediate transfer unit is easily replaceable.

What is claimed is:

1. An image forming apparatus comprising:

a plurality of image carrying member units each of which includes an image carrying member that carries a toner image on an outer circumferential surface and an image carrying member support frame that rotatably supports the image carrying member and which are aligned in a horizontal direction; and an intermediate transfer unit that includes an endless intermediate transfer belt which is rotatably supported and a plurality of primary transfer members which are opposite the image carrying members through the intermediate transfer belt, the intermediate transfer unit being removable with respect to a main body of the apparatus in the horizontal direction, wherein the image forming apparatus that primarily transfers, in a state where the intermediate transfer unit is fitted to the main body of the apparatus, the toner images carried on the outer circumferential surfaces of the image carrying members by the primary transfer members to the intermediate transfer belt includes:

a locating member that is arranged on a downstream side of the image carrying member units in a direction in which the intermediate transfer unit is fitted so as to locate the intermediate transfer unit in a fitting position in which the intermediate transfer unit is fitted to the main body of the apparatus;

image carrying member-side guide rails that are formed on upper end portions of the image carrying member support frames included in a first image carrying member unit closest to the locating member in the horizontal direction and a second image carrying member unit adjacent to the first image carrying member unit of the image carrying member units and extend along the horizontal direction; and a main body-side guide rail that is formed as a bridge in the horizontal direction between the image carrying member-side guide rails included in the first image carrying member unit and the second image carrying member unit, and when the intermediate transfer unit is fitted to the main body of the apparatus, the intermediate transfer unit slides on the image carrying member-side guide rails and the main body-side guide rail and is guided by the locating member to be located in the fitting position.

2. The image forming apparatus according to claim 1, wherein the intermediate transfer unit includes:

a belt support frame that rotatably supports the intermediate transfer belt; and an engagement protrusion portion that protrudes from the belt support frame outward with respect to the intermediate transfer belt in a direction of a rotation axis of the image carrying member, and the engagement protrusion portion slides on the image carrying member-side guide rails and the main body-side guide rail in a state where the intermediate transfer unit is guided by the image carrying member-side guide rails or the main body-side guide rail, and engages with the locating member in a state where the intermediate transfer unit is located in the fitting position.

3. The image forming apparatus according to claim 2, wherein the belt support frame includes an abutment rib that protrudes downward with respect to a lower surface of the intermediate transfer belt, and abuts on the main body of the apparatus in a state where the intermediate transfer unit is guided by the main body-side guide rail or the image carrying member-side guide rails so as to avoid contact between the intermediate transfer belt and the main body of the apparatus.

4. The image forming apparatus according to claim 3, wherein the abutment rib abuts on the main body of the apparatus in a state where the intermediate transfer unit is guided by the main body-side guide rail formed in the first image carrying member.

5. The image forming apparatus according to claim 3, wherein an opening portion which is open to an upper surface of the main body of the apparatus and a storage space which extends downward from the opening portion and in which the intermediate transfer unit is stored are formed, and when the intermediate transfer unit is fitted into the storage space or removed therefrom through the opening portion, the abutment rib abuts on an edge part of the opening portion to avoid contact between the intermediate transfer belt and the main body of the apparatus.

* * * * *